US012756223B2

(12) United States Patent
Shu et al.

(10) Patent No.: US 12,756,223 B2
(45) Date of Patent: Oct. 6, 2026

(54) UNINTERRUPTIBLE POWER SYSTEM, AND POWER SUPPLY METHOD AND POWER SUPPLY SYSTEM THEREOF

(71) Applicant: Huawei Digital Power Technologies Co., Ltd., Shenzhen (CN)

(72) Inventors: Zhou Shu, Dongguan (CN); Heng Zhang, Dongguan (CN); Chuntao Zhang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/211,532

(22) Filed: May 19, 2025

(65) Prior Publication Data

US 2025/0357783 A1 Nov. 20, 2025

(30) Foreign Application Priority Data

May 20, 2024 (CN) ......................... 202410628039.1

(51) Int. Cl.
*H02J 9/06* (2006.01)
*H02J 3/0014* (2026.01)

(52) U.S. Cl.
CPC ............ *H02J 9/062* (2013.01); *H02J 3/0014* (2026.01)

(58) Field of Classification Search
CPC .. H02J 9/062; H02J 3/0014; H02J 3/18; H02J 3/01; H02J 3/16; H02J 3/32; H02J 3/50; H02J 7/04; H02J 7/34; H02J 7/855; H02J 7/865; Y02E 40/40
See application file for complete search history.

(56) References Cited

U.S. PATENT DOCUMENTS

| | | | | |
|---|---|---|---|---|
| 2011/0278932 A1* | 11/2011 | Navarro | H02J 9/062 | 307/66 |
| 2012/0074786 A1* | 3/2012 | Johnson, Jr. | H02J 3/381 | 307/64 |
| 2012/0248897 A1* | 10/2012 | Savolainen | H02J 9/062 | 307/151 |
| 2015/0207362 A1* | 7/2015 | Ohnishi | H02J 9/062 | 307/65 |
| 2018/0152046 A1* | 5/2018 | Toyoda | H02J 9/062 | |
| 2023/0122255 A1 | 4/2023 | Shu et al. | | |

FOREIGN PATENT DOCUMENTS

| | | |
|---|---|---|
| CN | 102856935 B | 6/2015 |
| CN | 103236699 B | 2/2016 |

* cited by examiner

*Primary Examiner* — Regis J Betsch
*Assistant Examiner* — Alex W Lam
(74) *Attorney, Agent, or Firm* — Maier & Maier, PLLC

(57) ABSTRACT

An uninterruptible power system (UPS), and a power supply method and a power supply system thereof. In an economy mode, different power conversion modules in a plurality of power conversion modules are used to compensate for harmonic currents of different orders, which can reduce a computing power requirement for a single power conversion module, reduce system costs, and achieve effect of compensating for harmonic currents of a large quantity of orders, so as to reduce harmonic pollution of a power grid by the uninterruptible power system.

20 Claims, 3 Drawing Sheets

UNINTERRUPTIBLE POWER SYSTEM, AND POWER SUPPLY METHOD AND POWER SUPPLY SYSTEM THEREOF

CROSS-REFERENCE TO RELATED APPLICATION

This application claims priority to Chinese Patent Application No. 202410628039.1, filed on May 20, 2024, which is hereby incorporated by reference in its entirety.

TECHNICAL FIELD

The embodiments relate to the field of electric power technologies, and to an uninterruptible power system, and a power supply method and a power supply system thereof.

BACKGROUND

An uninterruptible power system (UPS) is a system capable of replacing a power grid to uninterruptedly supply power to a load to maintain normal operation of the load when a power grid failure (for example, a power outage, undervoltage, interference, or a surge) occurs. Specifically, the uninterruptible power system includes an uninterruptible power supply and a battery group, and the uninterruptible power supply is separately connected to the power grid, the load, and the battery group. The uninterruptible power system may monitor an operating status of the power grid. When the power grid normally operates, the uninterruptible power system may use electric energy supplied by the power grid to supply power to the load. When the power grid is faulty, the uninterruptible power system may control the battery group to discharge, and use electric energy output by the battery group to supply power to the load.

With improvement of reliability on a power grid side, the uninterruptible power system can run in an economy (economy control operation or ECO) mode. In the ECO mode, electric energy on the power grid side is directly supplied to the load through a bypass switch module in the uninterruptible power system. When the uninterruptible power system runs in the ECO mode, power supply efficiency is high, and a functional loss of a power supply link is low. However, the load may also inject a large current harmonic or fundamental reactive current into the power grid side, causing pollution of the power grid. Currently, to avoid the pollution of the power grid that is caused by injection of a harmonic current into the power grid in the ECO mode, the uninterruptible power system usually uses a power conversion module to compensate for the current harmonic or fundamental reactive current in the power grid, to improve the pollution of the power grid. In addition, to improve reliability and a loading capability of the uninterruptible power system, a plurality of power conversion modules in the uninterruptible power system evenly share harmonic currents of the load. In addition, limited by computing power of the power conversion modules, the plurality of power conversion modules usually only compensate for harmonic currents of some orders, for example, a $1^{st}$-order harmonic current to a $15^{th}$-order harmonic current. Therefore, improvement on pollution in the power grid is limited.

SUMMARY

The embodiments provide an uninterruptible power system, and a power supply method, and a power supply system thereof, to improve pollution of a harmonic current on a power grid without increasing system costs and computing power of a power conversion module.

According to a first aspect, the embodiments provide an uninterruptible power system (UPS). The system includes an input end, an output end, a bypass switch module, and a plurality of power conversion modules. The input end is configured to connect to a power grid, and the output end is configured to connect to a load. One end of the bypass switch module is connected to the input end, the other end of the bypass switch module is connected to the output end, and the bypass switch module is configured to connect the power grid to the load. In an economy (economy control operation or ECO) mode, electric energy on a power grid side is directly supplied to the load through the bypass switch module in the uninterruptible power system. Therefore, power supply efficiency is high, and a functional loss of a power supply link is low. In this process, if a current during running of the load includes a large harmonic current, the load may inject a large current harmonic or fundamental reactive current into the power grid. As a result, bypass input also includes a large harmonic current, and injection of the harmonic current into the power grid causes pollution of the power grid.

In this embodiment, different power conversion modules in the plurality of power conversion modules may be used to compensate for harmonic currents of different orders, to reduce a computing power requirement for a single power conversion module, reduce system costs, and achieve effect of compensating for harmonic currents of a large quantity of orders, so as to reduce harmonic pollution of the power grid by the uninterruptible power system. For example, one end of each of the plurality of power conversion modules is connected to the input end, and another end of each of the plurality of power conversion modules is connected to the output end. The plurality of power conversion modules may include a first power conversion module and a second power conversion module. When the uninterruptible power system is in the ECO mode, in other words, when the bypass switch module connects the power grid to the load, the first power conversion module is configured to output a first compensation current to compensate for a harmonic component of one specific order or harmonic components of some specific orders in a first current, and the second power conversion module is configured to output a second compensation current to compensate for a harmonic component of another specific order or harmonic components of some other specific orders in the first current. For example, the first compensation current includes a first quantity of first compensation harmonic components, and the first quantity of first compensation harmonic components may compensate for one or more harmonic components in the first current. The second compensation current includes a second quantity of second compensation harmonic components, and the second quantity of second compensation harmonic components may compensate for one or more other harmonic components in the first current. Both the first quantity and the second quantity are less than a total quantity of harmonic components in the first current, a frequency of one first compensation harmonic component in the first quantity of first compensation harmonic components is the same as a frequency of one harmonic component in the first current, and a frequency of one second compensation harmonic component in the second quantity of second compensation harmonic components is the same as a frequency of one harmonic component in the first current. A spectrum of the first quantity of first compensation harmonic components and a spectrum of the second quantity of second compensation harmonic components are completely different or not completely the same. The spectrum of the first quantity of first compensation harmonic components may be considered as a frequency set of the first compensation current, the spectrum of the second quantity of second compensation harmonic components may be considered as a frequency set of the second compensation current, and the two frequency sets may intersect or may not intersect. In addition, an amplitude of a compensation harmonic component needs to have an opposite sign to an amplitude of a harmonic component with a same frequency as the compensation harmonic component, to cancel out or weaken the harmonic component.

In this embodiment, the first power conversion module and the second power conversion module each may compensate for harmonic components of consecutive orders, or may compensate for harmonic components of nonconsecutive orders.

During actual application, in addition to the harmonic current, a fundamental reactive current can be generated in an operation process of the load. Therefore, a fundamental reactive current component may be further determined in the first current.

In some embodiments, the first power conversion module may also compensate for a fundamental reactive current component, and/or the second power conversion module may also compensate for a fundamental reactive current component. For example, the first compensation current may further include a compensation fundamental reactive current component, and/or the second compensation current may further include a compensation fundamental reactive current component, and a frequency of the compensation fundamental reactive current component is the same as a frequency of the fundamental reactive current component in the first current. In addition, an amplitude of a compensation fundamental reactive current component needs to have an opposite sign to an amplitude of a fundamental reactive current component with a same frequency as the compensation fundamental reactive current component, to cancel out or weaken the fundamental reactive current component in the power grid after the compensation fundamental reactive current component is output, and improve a situation of the fundamental reactive current in the power grid.

In some other embodiments, if a current effective value of a fundamental reactive current component in the first current is large, a third power conversion module may be further disposed separately in the plurality of power conversion modules, to separately compensate for the fundamental reactive current component. For example, the third power conversion module is configured to output a third compensation current, where the third compensation current includes a compensation fundamental reactive current component, and a frequency of the compensation fundamental reactive current component is the same as a frequency of the fundamental reactive current component in the first current. In addition, an amplitude of a compensation fundamental reactive current component needs to have an opposite sign to an amplitude of a fundamental reactive current component with a same frequency as the compensation fundamental reactive current component, to cancel out or weaken the fundamental reactive current component in the power grid after the compensation fundamental reactive current component is output, and improve a situation of the fundamental reactive current in the power grid.

In this embodiment, a quantity of first power conversion modules, a quantity of second power conversion modules, and a quantity of third power conversion modules may be determined based on current effective values of harmonic components that need to be compensated for in the first current and an optimal efficiency current value of a single power conversion module, to compensate for the harmonic current to the greatest extent, and enable the power conversion module to operate near an optimal efficiency operating point. The quantity of first power conversion modules is positively correlated with a current effective value of the first compensation harmonic component, and the quantity of second power conversion modules is positively correlated with a current effective value of the second compensation harmonic component. For example, the quantity of first power conversion modules may be obtained by rounding up (the current effective value of the harmonic component that needs to be compensated for/the optimal efficiency current value of the single power conversion module), the quantity of second power conversion modules may be obtained by rounding up (the current effective value of the harmonic component that needs to be compensated for/the optimal efficiency current value of the single power conversion module), and the quantity of third power conversion modules may be obtained by rounding up (the current effective value of the fundamental reactive current component that needs to be compensated for/the optimal efficiency current value of the single power conversion module). The rest may be deduced by analogy.

In some embodiments, after the quantity of first power conversion modules, the quantity of second power conversion modules, and the quantity of third power conversion modules separately meet the foregoing requirements, there may also be one or more fourth power conversion modules in the plurality of power conversion modules. The fourth power conversion module is in a sleep state, and does not compensate for any fundamental reactive current or harmonic current.

In some other embodiments, after the quantity of first power conversion modules, the quantity of second power conversion modules, and the quantity of third power conversion modules separately meet the foregoing requirements, a total quantity of the plurality of power conversion modules may alternatively be less than a sum of the quantity of first power conversion modules, the quantity of second power conversion modules, and the quantity of third power conversion modules. In this case, the quantity of first power conversion modules, the quantity of second power conversion modules, and the quantity of third power conversion modules need to be corrected, to ensure that the sum of the quantity of first power conversion modules, the quantity of second power conversion modules, and the quantity of third power conversion modules is less than or equal to the total quantity of the plurality of power conversion modules.

According to a second aspect, the embodiments provide a power supply method for an uninterruptible power system. The method is applicable to an ECO mode, and includes the following steps: controlling a bypass switch module to connect a power grid connected to an input end of the uninterruptible power system to a load connected to an output end, and detecting a first current between the input end and the output end; and controlling a first power conversion module to output a first compensation current, and controlling a second power conversion module to output a second compensation current. The first compensation current includes a first quantity of first compensation harmonic components, the second compensation current includes a second quantity of second compensation harmonic components, both the first quantity and the second quantity are less than a total quantity of harmonic components in the first current, a frequency of one first compensation harmonic component in the first quantity of first compensation harmonic components is the same as a frequency of one harmonic component in the first current, a frequency of one second compensation harmonic component in the second quantity of second compensation harmonic components is the same as a frequency of one harmonic component in the first current, and a spectrum of the first quantity of first compensation harmonic components and a spectrum of the second quantity of second compensation harmonic components are completely different or not completely the same. In addition, an amplitude of a compensation harmonic component needs to have an opposite sign to an amplitude of a harmonic component with a same frequency as the compensation harmonic component, to cancel out or weaken the harmonic component.

In the power supply method, different power conversion modules are used to compensate for harmonic currents of different orders, to reduce a computing power requirement for a single power conversion module, reduce system costs, and achieve effect of compensating for harmonic currents of a large quantity of orders, so as to reduce harmonic pollution of the power grid by the uninterruptible power system.

During actual application, in addition to the harmonic current, a fundamental reactive current can be generated in an operation process of the load. Therefore, a fundamental reactive current component may be further detected in the first current.

In some embodiments, the first compensation current may further include a compensation fundamental reactive current component, and/or the second compensation current may further include a compensation fundamental reactive current component, and a frequency of the compensation fundamental reactive current component is the same as a frequency of a fundamental reactive current component in the first current. In addition, an amplitude of a compensation fundamental reactive current component needs to have an opposite sign to an amplitude of a fundamental reactive current component with a same frequency as the compensation fundamental reactive current component, to cancel out or weaken the fundamental reactive current component in the power grid after the compensation fundamental reactive current component is output, and improve a situation of the fundamental reactive current in the power grid.

In some other embodiments, if a current effective value of a fundamental reactive current component in the first current is large, a third power conversion module may be further disposed separately in a plurality of power conversion modules, to separately compensate for the fundamental reactive current component. For example, the third power conversion module may be controlled to output a third compensation current, where the third compensation current includes a compensation fundamental reactive current component, and a frequency of the compensation fundamental reactive current component is the same as a frequency of the fundamental reactive current component in the first current. In addition, an amplitude of a compensation fundamental reactive current component needs to have an opposite sign to an amplitude of a fundamental reactive current component with a same frequency as the compensation fundamental reactive current component, to cancel out or weaken the fundamental reactive current component in the power grid after the compensation fundamental reactive current component is output, and improve a situation of the fundamental reactive current in the power grid.

In this embodiment, a quantity of first power conversion modules, a quantity of second power conversion modules, and a quantity of third power conversion modules may be determined based on current effective values of harmonic components that need to be compensated for in the first current and an optimal efficiency current value of a single power conversion module. Therefore, the quantity of first power conversion modules may be further controlled to be positively correlated with a current effective value of the first compensation harmonic component, and the quantity of second power conversion modules may be further controlled to be positively correlated with a current effective value of the second compensation harmonic component. For example, the quantity of first power conversion modules may be obtained by rounding up (the current effective value of the harmonic component that needs to be compensated for/the optimal efficiency current value of the single power conversion module), the quantity of second power conversion modules may be obtained by rounding up (the current effective value of the harmonic component that needs to be compensated for/the optimal efficiency current value of the single power conversion module), and the quantity of third power conversion modules may be obtained by rounding up (the current effective value of the fundamental reactive current component that needs to be compensated for/the optimal efficiency current value of the single power conversion module). The rest may be deduced by analogy.

In some embodiments, after the quantity of first power conversion modules, the quantity of second power conversion modules, and the quantity of third power conversion modules separately meet the foregoing requirements, there may also be one or more fourth power conversion modules in the plurality of power conversion modules. The fourth power conversion module may be controlled to be in a sleep state, and does not compensate for any fundamental reactive current or harmonic current.

In some other embodiments, after the quantity of first power conversion modules, the quantity of second power conversion modules, and the quantity of third power conversion modules separately meet the foregoing requirements, a total quantity of the plurality of power conversion modules may alternatively be less than a sum of the quantity of first power conversion modules, the quantity of second power conversion modules, and the quantity of third power conversion modules. In this case, the quantity of first power conversion modules, the quantity of second power conversion modules, and the quantity of third power conversion modules need to be corrected, to ensure that the sum of the quantity of first power conversion modules, the quantity of second power conversion modules, and the quantity of third power conversion modules is less than or equal to the total quantity of the plurality of power conversion modules.

According to a third aspect, the embodiments further provide a power supply system. The system includes any uninterruptible power system provided in the first aspect and a battery group connected to the uninterruptible power system. Because the battery group may undergo frequent charging and discharging processes, a battery type suitable for frequent charging and discharging can be selected. For example, a lithium battery may be selected. When the battery group is used in a small power supply system, the battery group may be disposed inside or outside the UPS. When the battery group is used in a medium or large power supply system, the battery group is large in size and can be disposed outside the UPS.

For effects that can be achieved in the second aspect and the third aspect, refer at least to the descriptions of effects that can be achieved in any possible design, embodiment, or implementation of the first aspect. Details are not described herein again.

DETAILED DESCRIPTION OF EMBODIMENTS

To make objectives, solutions, and advantages clearer, the following further describes the embodiments in detail with reference to accompanying drawings. A specific operation method in a method embodiment may also be applied to an apparatus embodiment or a system embodiment. It should be noted that, in descriptions of the embodiments, "at least one" means one or more, and "a plurality of" means two or more. In view of this, in embodiments, "a plurality of" may also be understood as "at least two". "And/or" describes an association relationship between associated objects and represents that three relationships may exist. For example, A and/or B may represent the following three cases: only A exists, both A and B exist, and only B exists. In addition, unless otherwise specified, the character "/" generally indicates an "or" relationship between associated objects. In addition, it should be understood that in the descriptions of the embodiments, terms such as "first" and "second" are merely used for distinguishing and description, but should not be understood as indicating or implying relative importance, or should not be understood as indicating or implying a sequence.

Currently, a large quantity of devices as small as household appliances or as large as data centers and factory production lines operate and depend on electric power. Electric power supply has become one of factors for maintaining normal functioning of the modern society. Therefore, a large-scale power grid is constructed for a country, and electric energy produced by a power plant may be transmitted, through the power grid, to a device that requires electric power for operation.

However, the power grid may be subject to a risk of power interruption. When power interruption occurs in the power grid, the device may be damaged, and use experience of people is also affected. For example, when a data center encounters a sudden power failure, important data may be lost. When an electric lamp encounters a sudden power failure, night lighting for people may be affected, thereby causing inconvenience to life of people. In other words, the power grid cannot ensure stable power supply to a load due to various occasional abnormalities or power outages of the power grid.

Figure 1:
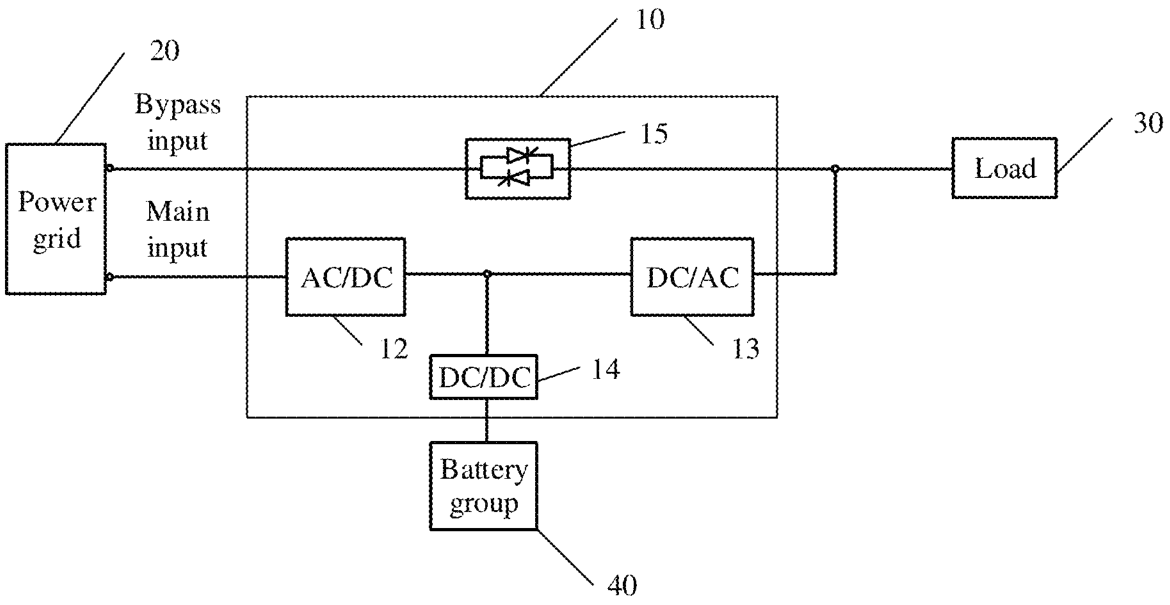
FIG. 1 is a schematic of a circuit structure of an uninterruptible power system.

In view of this, an uninterruptible power system has emerged and has been more widely used. When the power grid is abnormal, the uninterruptible power system continues to supply electric energy to the load through an energy storage component such as a battery or a flywheel, to ensure electrical safety of the load. FIG. 1 is an example of a schematic of a circuit structure of an uninterruptible power system. As shown in FIG. 1, the uninterruptible power system 10 is separately connected to a power grid 20, a load 30, and a battery group 40. The uninterruptible power system 10 includes a rectifier (AC/DC) 12, an inverter (DC/AC) 13, and a charging and discharging circuit (DC/DC) 14 that are connected to a bus of main input. When the power grid 20 normally provides input, the uninterruptible power system 10 converts and regulates, through the AC/DC 12 and the DC/AC 13, electric energy supplied by the power grid 20, to supply power to the load 30; and charges the battery group 40 through the DC/DC 14. When the power grid 20 is interrupted (or an accident power outage occurs), the uninterruptible power system 10 immediately converts and regulates direct current electric energy of the battery group 40 through the DC/DC 14 and the DC/AC 13, to supply power to the load 30. In some application scenarios, as a backup of a power supply link, the uninterruptible power system 10 may further include a bypass switch module 15 connected to a bus of bypass input. When the bypass input is normal, the electric energy supplied by the power grid 20 may also be directly supplied to the load 30 through the bypass input via the bypass switch module 15, that is, the uninterruptible power system may run in an economy mode.

The power grid 20 may be an urban power grid, a photovoltaic power grid, a micro power grid, a home power grid, an industrial power grid, or the like. The power grid 20 may continuously supply power to the uninterruptible power system 10. There are a plurality of possibilities for the electric energy supplied by the power grid 20 to the uninterruptible power system 10. For example, the electric energy may be an alternating current, a direct current, a high-frequency alternating current, a low-frequency alternating current, high-voltage electric energy, or low-voltage electric energy. A type of the electric energy supplied by the power grid 20 to the uninterruptible power system 10 can be determined based on a type of the power grid 20. This is not limited.

When the power grid 20 keeps supplying power, the uninterruptible power system 10 may supply power to the load 30 by using the electric energy supplied by the power grid 20. For example, in a possible implementation, the power grid 20 may directly forward, to the load 30 through the bypass input, the electric energy supplied by the power grid 20. For example, if the power grid 20 inputs a 220 V, 50 Hz alternating current to the uninterruptible power system 10, the uninterruptible power system 10 directly outputs the 220 V, 50 Hz alternating current to the load 30 through the bypass input.

In another possible implementation, the uninterruptible power system 10 may alternatively convert the electric energy supplied by the power grid 20, for example, in one or more of the following conversion manners: rectifier conversion, inverter conversion, boost conversion, and buck conversion, to output electric energy adapting to the load 30. For example, the power grid 20 inputs alternating current electric energy to the uninterruptible power system 10, and the load 30 is a direct current load. In this case, the uninterruptible power system 10 may perform rectifier conversion on the alternating current electric energy supplied by the power grid 20, to convert the alternating current electric energy into direct current electric energy, and then supply the direct current electric energy to the load 30. If a voltage of the direct current electric energy obtained through rectifier conversion is high and the load 30 is a low-voltage direct current load, the uninterruptible power system 10 may further perform buck conversion on the direct current electric energy to obtain low-voltage direct current electric energy, and then supply the low-voltage direct current electric energy to the load 30.

When the power grid 20 keeps supplying power, the uninterruptible power system 10 may continuously monitor a power supply status of the power grid 20. When a power supply failure occurs in the power grid 20, the uninterruptible power system 10 may continue to supply power to the load 30 by using the electric energy supplied by the battery group 40. It should be noted that a condition where "a power supply failure occurs in the power grid 20" should be understood as the uninterruptible power system 10 cannot receive normal electric energy from the power grid 20. For example, the uninterruptible power system 10 cannot receive electric energy from the power grid 20, or a voltage sag occurs in electric energy supplied by the power grid 20 (a voltage input by the power grid 20 is 15% to 20% lower than a nominal voltage for seconds), or a surge occurs in electric energy supplied by the power grid 20 (a voltage input by the power grid 20 is more than 10% higher than a nominal voltage for seconds), or severe interference exists in electric energy supplied by the power grid 20. All these abnormalities may be understood as that "a power supply failure occurs in the power grid 20".

When continuing to supply power to the load 30 by using the electric energy supplied by the battery group 40, the uninterruptible power system 10 may directly forward, to the load 30, the electric energy supplied by the battery group 40; or may convert the electric energy supplied by the battery group 40, for example, in one or more of the following conversion manners: inverter conversion, boost conversion, and buck conversion, to output electric energy adapting to the load 30. For example, the load 30 is an alternating current load, and the uninterruptible power system 10 may perform inverter conversion on direct current electric energy supplied by the battery group 40, to obtain alternating current electric energy, and supply the alternating current electric energy to the load 30.

The battery group 40 may include a plurality of batteries, and the battery group 40 supplying power to the uninterruptible power system 10 may be understood as that the plurality of batteries output electric energy to the uninterruptible power system 10 in parallel. In some embodiments, the batteries in the battery group 40 may be storage batteries. When the power grid 20 keeps supplying power, the uninterruptible power system 10 may charge the battery group 40 by using the electric energy supplied by the power grid 20. When the power supply failure occurs in the power grid 20, the battery group 40 may release stored electric energy to the uninterruptible power system 10, so that the uninterruptible power system 10 can maintain uninterrupted power supply to the load 30.

When using the battery group 40 to supply power, the uninterruptible power system 10 may further continuously monitor the power supply status of the power grid 20. After the power grid 20 resumes power supply, the uninterruptible power system 10 may switch to the power grid 20 for power supply, and continue to supply power to the load 30 by using the electric energy supplied by the power grid 20.

The load 30 runs by using the electric energy supplied by the uninterruptible power system 10. It should be understood that there may be different implementations of the load 30 based on variations of application scenarios. For example, the load 30 may be a household appliance, for example, a refrigerator, a washing machine, an air conditioner, or an electric lamp. In this case, the power grid 20 may be a home power grid, and the uninterruptible power system may uninterruptedly supply power to the household appliance. For another example, the load 30 may be a community. In this case, the power grid 20 may be an urban power grid, and the uninterruptible power system may uninterruptedly supply power to all residents in the community. For still another example, the load 30 may be a data center. In this case, the power grid 20 may be an industrial power grid, and the uninterruptible power system may uninterruptedly supply power to the data center. There are a plurality of possibilities for the application scenario of the uninterruptible power system, which are not listed one by one, but are encompassed by the scope of the embodiments.

The uninterruptible power system 10 runs in the ECO mode, and electric energy on a power grid side is directly supplied to the load through the bypass switch module in the uninterruptible power system, so that power supply efficiency is high, and a functional loss of a power supply link is low. However, if a current of the load includes a large harmonic current, the load may inject a large current harmonic or fundamental reactive current into the power grid side. As a result, bypass input side also includes a large harmonic current, and injection of the harmonic current into the power grid causes pollution of the power grid.

Figure 2:
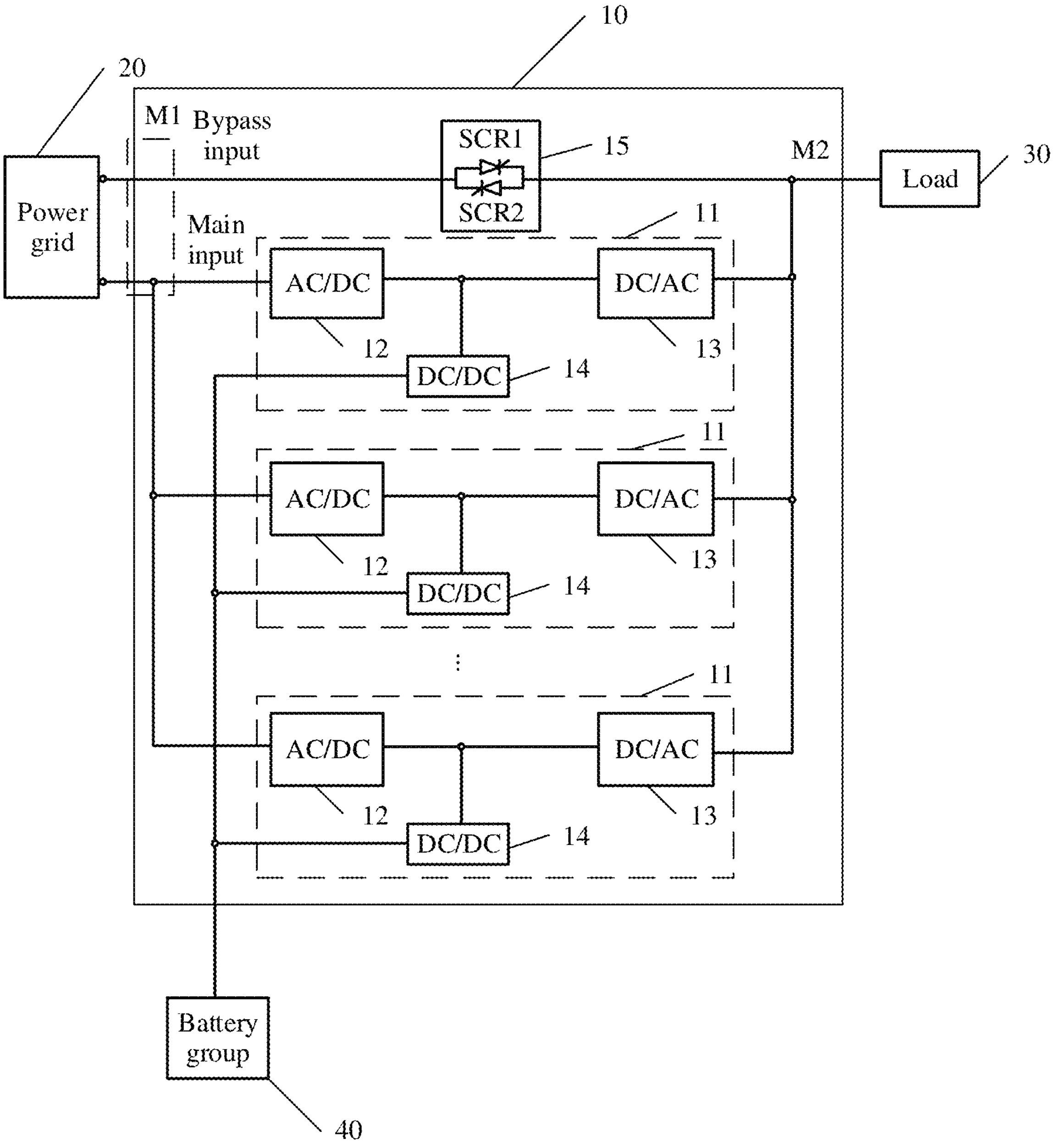
FIG. 2 is a schematic of another circuit structure of an uninterruptible power system.

FIG. 2 is an example of a schematic of a circuit structure of another uninterruptible power system. As shown in FIG. 2, currently, to improve quality of electric energy of bypass input in an ECO mode, and avoid pollution of a power grid that is caused by injection of a harmonic current into the power grid, the uninterruptible power system needs to use a power conversion module 11 to compensate for a current harmonic or fundamental reactive current in the power grid, to improve the pollution of the power grid. The power conversion module 11 includes components such as an AC/DC 12, a DC/AC 13, and a DC/DC 14 that are connected to a bus of main input. After harmonic current compensation by the power conversion module 11, a current harmonic of the bypass input is greatly reduced, and therefore harmonic pollution of the power grid by the uninterruptible power system in the ECO mode is reduced. In addition, to improve reliability and a loading capability of the uninterruptible power system, a plurality of power conversion modules 11 connected in parallel may be disposed in the uninterruptible power system, and the plurality of power conversion modules 11 connected in parallel evenly share harmonic currents of a load. Because computing power of the power conversion module 11 is positively correlated with a quantity of orders of harmonic currents that can be compensated for, limited by the computing power of the power conversion module 11, the plurality of power conversion modules 11 may only compensate for harmonic currents of some orders, for example, a $1^{st}$-order harmonic current to a $15^{th}$-order harmonic current (the $1^{st}$-order harmonic current is a fundamental reactive current). When high-order harmonic currents (for example, a $16^{th}$-order harmonic current to a $40^{th}$-order harmonic current) account for a large proportion in the harmonic currents of the load, the current harmonic of the bypass input is also large. Therefore, improvement on pollution in the power grid is limited. If the power conversion module 11 needs to compensate for harmonic currents of a large quantity of orders (for example, the $1^{st}$-order harmonic current to the $40^{th}$-order harmonic current), the computing power of the power conversion module 11 needs to be improved, and system costs are increased. Therefore, how to implement compensation for the harmonic currents of the large quantity of orders (for example, the $1^{st}$-order harmonic current to the $40^{th}$-order harmonic current) and reduce the harmonic pollution of the power grid by the uninterruptible power system without increasing the computing power of the power conversion module 11 and the system costs is a problem that urgently needs to be resolved in this field.

In view of this, embodiments provide a new uninterruptible power system, and a power supply method and a power supply system thereof, to compensate for harmonic currents of a large quantity of orders and reduce pollution of a power grid by the harmonic currents without increasing computing power of a power conversion module and system costs.

To make objectives, features, and advantages of the embodiments clearer and more comprehensible, and to facilitate full understanding of the solutions in embodiments, terms or concepts used herein are first described.

1. Active power and fundamental reactive power: In a scenario in which a power supply system supplies an alternating current to a load, total electric power includes the active power and the fundamental reactive power. The active power may be electric power required for running the load, for example, electric power required by the load to convert electric energy into heat energy, mechanical energy, or the like. In some embodiments, the active power may be understood as electric power consumed by the load. The fundamental reactive power may be power consumed on a component such as a capacitor or an inductor, and may be understood as electric power consumed by a non-load component, for example, electric power consumed by the power supply system, or electric power consumed by an inductor element to convert electric energy into magnetic field energy.
2. Current harmonic: In a scenario in which a power supply system supplies an alternating current to a load, in an ideal state, a waveform of a current or a voltage in a cable is a sinusoidal periodic waveform, and the voltage or the current may be referred to as a fundamental voltage or a fundamental current. However, due to factors such as access of the load, the waveform of the current or the voltage in the cable may be distorted. In this case, the waveform of the current or the voltage in the cable is a non-sinusoidal periodic waveform. A Fourier series expansion form of the current or the voltage in the cable may include a sinusoidal periodic wave (that is, a fundamental wave) in the ideal state and one or more harmonics. A waveform of each harmonic is also the sinusoidal periodic waveform, and a frequency of the harmonic is an integer multiple of a frequency of the fundamental wave.

A fundamental wave in a non-sinusoidal periodic current may be referred to as a fundamental component, a fundamental current, a current fundamental wave, or the like in the current; and a harmonic in the non-sinusoidal periodic current may be referred to as a harmonic component, a harmonic current, a current harmonic, or the like in the current. A fundamental wave in a non-sinusoidal periodic voltage may be referred to as a fundamental component, a fundamental voltage, a voltage fundamental wave, or the like in the voltage; and a harmonic in the non-sinusoidal periodic voltage may be referred to as a harmonic component, a harmonic voltage, a voltage harmonic, or the like in the voltage.

3. Active current and reactive current: In a scenario in which a power supply system supplies an alternating current to a load, a fundamental current in a current of a cable includes an active current component and a reactive current component. The active current component may be a current part generated due to running of the load, and the reactive current component may be a current part generated when a non-load element consumes power.

The following clearly describes the solutions in embodiments with reference to the accompanying drawings. It is clear that the described embodiments are merely a part, rather than all, of the embodiments. All other embodiments obtained by a person of ordinary skill in the art based on embodiments herein without creative efforts shall fall within the scope of the embodiments.

FIG. 2 is an example of a schematic of a circuit structure of an uninterruptible power system according to an embodiment. With reference to FIG. 2, in an embodiment, the uninterruptible power system 10 includes an input end M1, an output end M2, a bypass switch module 15, and a plurality of power conversion modules 11. The input end M1 may include main input and bypass input, the input end M1 is configured to connect to a power grid 20, and the output end M2 is configured to connect to a load 30.

One end of the bypass switch module 15 is connected to the bypass input in the input end M1, the other end of the bypass switch module 15 is connected to the output end M2, and the bypass switch module 15 is configured to connect the power grid 20 to the load 30. In an ECO mode, electric energy on a power grid side is directly supplied to the load 30 through the bypass switch module 15 in the uninterruptible power system 10. Therefore, power supply efficiency is high, and a functional loss of a power supply link is low. As shown in FIG. 2, the bypass switch module 15 may include a switch SCR1 and a switch SCR2. A direction of transmitting a current when the switch SCR1 is in an on state is opposite to a direction of transmitting a current when the switch SCR2 is in the on state. The switch SCR1 may be configured to connect the input end M1 to the output end M2 in a positive half cycle, to connect the power grid to the load. The switch SCR2 may be configured to connect the input end M1 to the output end M2 in a negative half cycle, to connect the power grid to the load.

One end of each power conversion module 11 is connected to the main input in the input end M1, and another end of each power conversion module 11 is connected to the output end M2. Each power conversion module 11 may include a rectifier (AC/DC) 12, an inverter (DC/AC) 13, and a charging and discharging circuit (DC/DC) 14. The AC/DC 12 may convert an alternating current input through the input end M1 into a direct current, and provide the direct current for the DC/AC 13 and the DC/DC 14. One end of the DC/AC 13 is separately connected to the DC/DC 14 and the AC/DC 12, and the other end is connected to the output end M2. The DC/AC 13 may convert the received direct current output by the AC/DC 12 or a received direct current output by the DC/DC 14 into an alternating current, and output the alternating current through the output end M2. In some examples, the DC/AC 13 may have a bidirectional processing capability. The DC/AC 13 may not only have a capability of converting a direct current into an alternating current, but also have a capability of converting an alternating current into a direct current. For example, the DC/AC 13 may obtain electric energy from the output end M2, and the obtained electric energy may support the DC/AC 13 in converting a direct current into an alternating current. One end of the DC/DC 14 is separately connected to the AC/DC 12 and the DC/AC 13, and the other end is connected to a battery group 40. The DC/DC 14 may have a bidirectional processing capability. The DC/DC 14 may perform voltage conversion on the direct current output by the AC/DC 12, and transmit processed electric energy to the battery group 40; and the battery group 40 stores the electric energy. The DC/DC 14 may also receive a direct current output by the battery group 40, perform voltage conversion on the direct current, and output the direct current to the AC/DC 12 or the DC/AC 13.

In some possible scenarios, the uninterruptible power system 10 may be adjusted to be in the ECO mode, so that all or a part of alternating currents in alternating currents input into the uninterruptible power system are used to supply power to the load 30 through the bypass switch module 15. In this process, if a current during running of the load 30 includes a large harmonic current, the load 30 may inject a large current harmonic or fundamental reactive current into the power grid 20. As a result, the bypass input also includes a large harmonic current, and injection of the harmonic current into the power grid 20 causes pollution of the power grid 20. A situation of harmonic currents and/or fundamental reactive currents in the power grid 20 may be understood by collecting a first current between the input end M1 and the output end M2, so that the plurality of power conversion modules 11 output corresponding compensation currents based on harmonics, to improve quality of the power grid 20. For example, a collection point of the first current may be disposed between the output end M2 of the UPS and the load 30.

In this embodiment, different power conversion modules 11 in the plurality of power conversion modules may be used to compensate for harmonic currents of different orders, to reduce a computing power requirement for a single power conversion module 11, reduce system costs, and achieve effect of compensating for harmonic currents of a large quantity of orders, so as to reduce harmonic pollution of the power grid by the uninterruptible power system.

In this embodiment, the plurality of power conversion modules may include a first power conversion module and a second power conversion module. When the uninterruptible power system 10 is in the ECO mode, in other words, when the bypass switch module 15 connects the power grid 20 to the load 30, the first power conversion module is configured to output a first compensation current to compensate for a harmonic component of one specific order or harmonic components of some specific orders in the first current, and the second power conversion module is configured to output a second compensation current to compensate for a harmonic component of another specific order or harmonic components of some other specific orders in the first current. For example, the first compensation current includes a first quantity of first compensation harmonic components, and the first quantity of first compensation harmonic components may compensate for one or more harmonic components in the first current. The second compensation current includes a second quantity of second compensation harmonic components, and the second quantity of second compensation harmonic components may compensate for one or more other harmonic components in the first current. Both the first quantity and the second quantity are less than a total quantity of harmonic components in the first current. For example, the first current includes harmonic currents of 40 orders, in other words, the total quantity of harmonic components in the first current is 40. In this case, both the first quantity and the second quantity are less than 40. In other words, the first quantity and the second quantity each may be any value from 1 to 39. For example, the first quantity may be 20, and the second quantity may be 20. A frequency of one first compensation harmonic component in the first quantity of first compensation harmonic components is the same as a frequency of one harmonic component in the first current, and a frequency of one second compensation harmonic component in the second quantity of second compensation harmonic components is the same as a frequency of one harmonic component in the first current. In addition, an amplitude of a compensation harmonic component needs to have an opposite sign to an amplitude of a harmonic component with a same frequency as the compensation harmonic component, to cancel out or weaken the harmonic component.

For example, the first current may include a plurality of harmonic components, a frequency of each harmonic component is an integer multiple of a fundamental frequency of the power grid, and orders of the harmonic components in the first current are different. It is assumed that the harmonic components in the first current are separately a harmonic component a, a harmonic component b, and a harmonic component c, and the quantity of harmonic components in the first current is 3. The first power conversion module outputs the first compensation current, where the first compensation current may include the first quantity of first compensation harmonic components, and the first quantity may be less than 3. The second power conversion module outputs the second compensation current, where the second compensation current may include the second quantity of second compensation harmonic components, and the second quantity may be less than 3.

Frequencies of the first quantity of first compensation harmonic components and frequencies of the second quantity of second compensation harmonic components may be completely different. For example, the first compensation current may include one first compensation harmonic component, which is denoted as a first compensation harmonic component A. A frequency of the first compensation harmonic component A may be the same as a frequency of the harmonic component a, and an amplitude of the first compensation harmonic component A is approximately opposite to an amplitude of the harmonic component a. In other words, the first compensation harmonic component A may compensate for (or cancel out) the harmonic component a, so that the harmonic component a in the power grid is eliminated. Correspondingly, the second compensation current may include one or two second compensation harmonic components, which are denoted as a second compensation harmonic component B and a second compensation harmonic component C. A frequency of the second compensation harmonic component B may be the same as a frequency of the harmonic component b, and an amplitude of the second compensation harmonic component B is approximately opposite to an amplitude of the harmonic component b. In other words, the second compensation harmonic component B may compensate for (or cancel out) the harmonic component b, so that the harmonic component b in the power grid is eliminated. A frequency of the second compensation harmonic component C may be the same as a frequency of the harmonic component c, and an amplitude of the second compensation harmonic component C is approximately opposite to an amplitude of the harmonic component c. In other words, the second compensation harmonic component C may compensate for (or cancel out) the harmonic component c, so that the harmonic component c in the power grid is eliminated. In this way, the quality of the power grid is improved.

A spectrum of the first quantity of first compensation harmonic components and a spectrum of the second quantity of second compensation harmonic components may not be completely the same, in other words, the first compensation current and the second compensation current may compensate for a harmonic component of a same order or harmonic components of some same orders. For example, the first compensation current may include two first compensation harmonic components, which are denoted as a first compensation harmonic component A and a first compensation harmonic component B. A frequency of the first compensation harmonic component A may be the same as a frequency of the harmonic component a, and an amplitude of the first compensation harmonic component A is approximately opposite to an amplitude of the harmonic component a. A frequency of the first compensation harmonic component B may be the same as a frequency of the harmonic component b, an amplitude of the first compensation harmonic component B is approximately half of an amplitude of the harmonic component b, and the amplitude of the first compensation harmonic component B has an opposite sign to the amplitude of the harmonic component b. Correspondingly, the second compensation current may include two second compensation harmonic components, which are denoted as a second compensation harmonic component B and a second compensation harmonic component C. A frequency of the second compensation harmonic component B may be the same as a frequency of the harmonic component b, an amplitude of the second compensation harmonic component B is approximately half of an amplitude of the harmonic component b, and the amplitude of the second compensation harmonic component B has an opposite sign to the amplitude of the harmonic component b. In other words, the second compensation harmonic component B may compensate for (or cancel out) the harmonic component b, so that the harmonic component b in the power grid is eliminated. A frequency of the second compensation harmonic component C may be the same as a frequency of the harmonic component c, and an amplitude of the second compensation harmonic component C is approximately opposite to an amplitude of the harmonic component c. In other words, the second compensation harmonic component C may compensate for (or cancel out) the harmonic component c, so that the harmonic component c in the power grid is eliminated. In this way, the quality of the power grid is improved.

In this embodiment, the first power conversion module and the second power conversion module each may compensate for harmonic components of consecutive orders, or may compensate for harmonic components of nonconsecutive orders. For example, during actual application, the first current may include a $2^{nd}$-order harmonic component to a $40^{th}$-order harmonic component, a frequency of each harmonic component is an integer multiple of the fundamental frequency of the power grid, and orders of the harmonic components in the first current are different. For example, the first compensation current output by the first power conversion module may compensate for the $2^{nd}$-order harmonic component to a $15^{th}$-order harmonic component, in other words, the first compensation current includes 14 first compensation harmonic components, where a frequency of one first compensation harmonic component is the same as a frequency of one harmonic component in the $2^{nd}$-order harmonic component to the $15^{th}$-order harmonic component. The second compensation current output by the second power conversion module may compensate for a $16^{th}$-order harmonic component to the $40^{th}$-order harmonic component, in other words, the second compensation current includes 25 second compensation harmonic components, where a frequency of one second compensation harmonic component is the same as a frequency of one harmonic component in the $16^{th}$-order harmonic component to the $40^{th}$-order harmonic component. For another example, the first compensation current output by the first power conversion module may compensate for even-order harmonic components, in other words, the first compensation current includes 20 first compensation harmonic components, where a frequency of one first compensation harmonic component is the same as a frequency of one harmonic component in the even-order harmonic components. The second compensation current output by the second power conversion module may compensate for odd-order harmonic components, in other words, the second compensation current includes 19 second compensation harmonic components, where a frequency of one second compensation harmonic component is the same as a frequency of one harmonic component in the odd-order harmonic components.

During actual application, in addition to the harmonic current, a fundamental reactive current can be generated in an operation process of the load. Therefore, a fundamental reactive current component may be further determined in the first current.

In some embodiments, the first power conversion module may also compensate for a fundamental reactive current component, and/or the second power conversion module may also compensate for a fundamental reactive current component. For example, the first compensation current may further include a compensation fundamental reactive current component, and/or the second compensation current may further include a compensation fundamental reactive current component, and a frequency of the compensation fundamental reactive current component is the same as a frequency of the fundamental reactive current component in the first current. In addition, an amplitude of a compensation fundamental reactive current component needs to have an opposite sign to an amplitude of a fundamental reactive current component with a same frequency as the compensation fundamental reactive current component, to cancel out or weaken the fundamental reactive current component in the power grid after the compensation fundamental reactive current component is output, and improve a situation of the fundamental reactive current in the power grid.

In some other embodiments, if a current effective value of a fundamental reactive current component in the first current is large, a third power conversion module may be further disposed separately in the plurality of power conversion modules, to separately compensate for the fundamental reactive current component. For example, the third power conversion module is configured to output a third compensation current, where the third compensation current includes a compensation fundamental reactive current component, and a frequency of the compensation fundamental reactive current component is the same as a frequency of the fundamental reactive current component in the first current. In addition, an amplitude of a compensation fundamental reactive current component needs to have an opposite sign to an amplitude of a fundamental reactive current component with a same frequency as the compensation fundamental reactive current component, to cancel out or weaken the fundamental reactive current component in the power grid after the compensation fundamental reactive current component is output, and improve a situation of the fundamental reactive current in the power grid.

In this embodiment, a quantity of first power conversion modules, a quantity of second power conversion modules, and a quantity of third power conversion modules may be determined based on current effective values of harmonic components that need to be compensated for in the first current and an optimal efficiency current value of a single power conversion module, to compensate for the harmonic current to the greatest extent, and enable the power conversion module to operate near an optimal efficiency operating point. The quantity of first power conversion modules is positively correlated with a current effective value of the first compensation harmonic component, and the quantity of second power conversion modules is positively correlated with a current effective value of the second compensation harmonic component. For example, the quantity of first power conversion modules may be obtained by rounding up (the current effective value of the harmonic component that needs to be compensated for/the optimal efficiency current value of the single power conversion module), the quantity of second power conversion modules may be obtained by rounding up (the current effective value of the harmonic component that needs to be compensated for/the optimal efficiency current value of the single power conversion module), and the quantity of third power conversion modules may be obtained by rounding up (the current effective value of the fundamental reactive current component that needs to be compensated for/the optimal efficiency current value of the single power conversion module). The rest may be deduced by analogy.

In some embodiments, after the quantity of first power conversion modules, the quantity of second power conversion modules, and the quantity of third power conversion modules separately meet the foregoing requirements, there may also be one or more fourth power conversion modules in the plurality of power conversion modules. The fourth power conversion module is in a sleep state, and does not compensate for any fundamental reactive current or harmonic current.

In some other embodiments, after the quantity of first power conversion modules, the quantity of second power conversion modules, and the quantity of third power conversion modules separately meet the foregoing requirements, a total quantity of the plurality of power conversion modules may alternatively be less than a sum of the quantity of first power conversion modules, the quantity of second power conversion modules, and the quantity of third power conversion modules. In this case, the quantity of first power conversion modules, the quantity of second power conversion modules, and the quantity of third power conversion modules need to be corrected, to ensure that the sum of the quantity of first power conversion modules, the quantity of second power conversion modules, and the quantity of third power conversion modules is less than or equal to the total quantity of the plurality of power conversion modules.

It should be noted that, in the foregoing descriptions, the first power conversion module and the second power conversion module do not specifically mean that the plurality of power conversion modules are divided into only two groups of power conversion modules. During actual application, based on orders of harmonic currents that need to be compensated for, the plurality of power conversion modules may be divided into a plurality of groups, for example, three or four groups. Any two groups of power conversion modules meet features of the first power conversion module and the second power conversion module in the foregoing descriptions.

Figure 3:
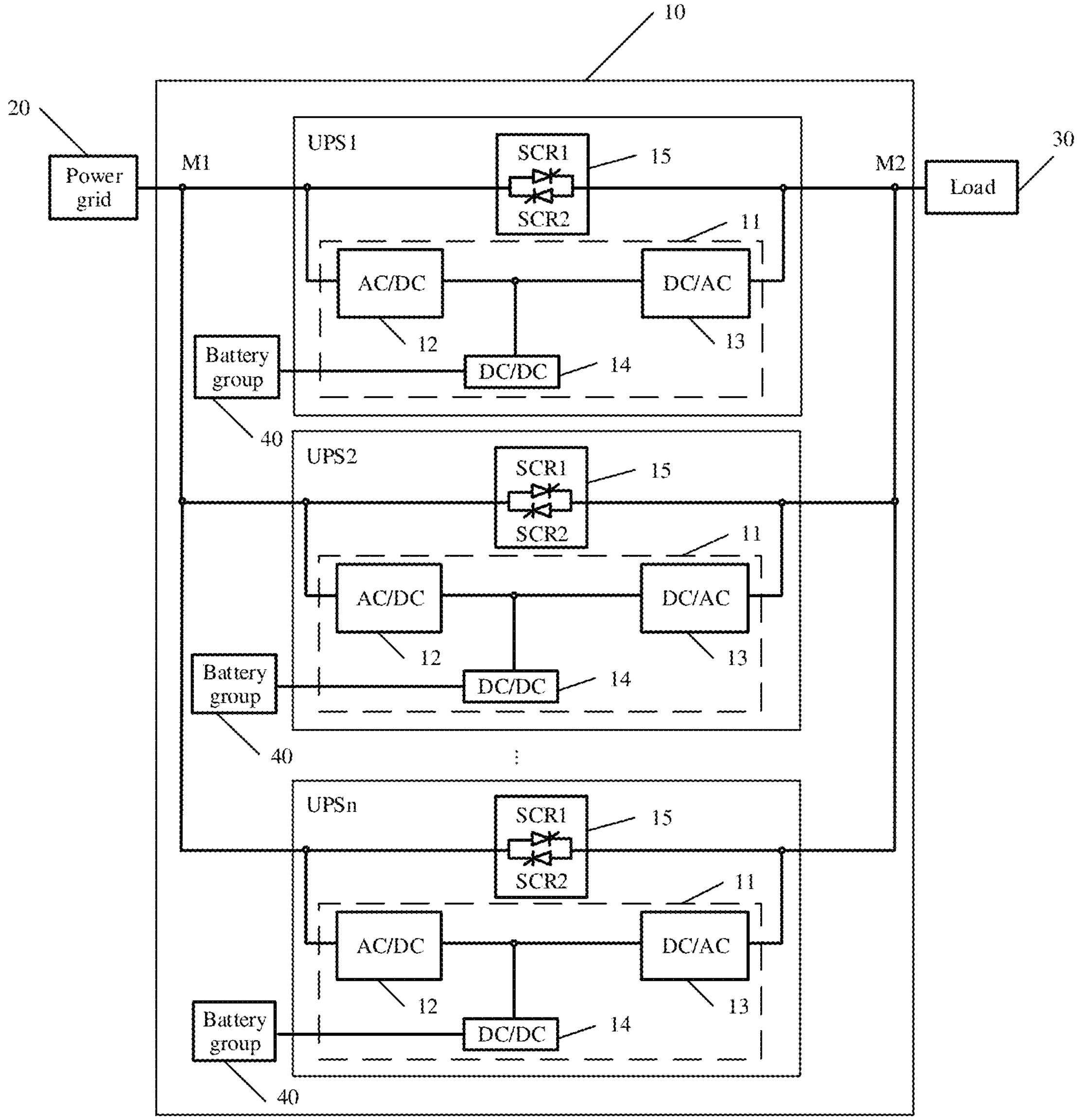
FIG. 3 is a schematic of another circuit structure of an uninterruptible power system.

A circuit architecture of the uninterruptible power system provided in this embodiment may be a topology shown in FIG. 2 in which the UPS includes the plurality of power conversion modules that are connected in parallel. With reference to FIG. 3, this embodiment is also applicable to a circuit architecture in which a plurality of UPSs are connected in parallel. Each UPS includes a bypass switch module 15 and a power conversion module 11, and power conversion modules 11 belonging to different UPSs are used as the first power conversion module and the second power conversion module, and are configured to compensate for harmonic currents of different orders.

Figure 4:
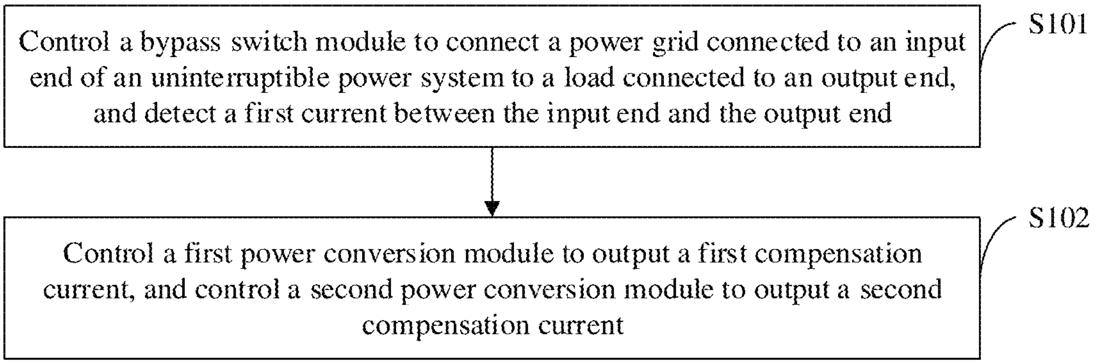
FIG. 4 is a schematic flowchart of a power supply method for an uninterruptible power system according to an embodiment.

FIG. 4 is an example of a schematic flowchart of a power supply method for an uninterruptible power system according to an embodiment. The power supply method for an uninterruptible power system may be performed by a control module, a control chip, control software, or the like. This is not limited.

With reference to FIG. 4, in an embodiment, the power supply method for an uninterruptible power system operates in an ECO mode, and includes the following steps:

S101: Control a bypass switch module to connect a power grid connected to an input end of the uninterruptible power system to a load connected to an output end, and detect a first current between the input end and the output end.

S102: Control a first power conversion module to output a first compensation current, and control a second power conversion module to output a second compensation current. The first compensation current includes a first quantity of first compensation harmonic components, the second compensation current includes a second quantity of second compensation harmonic components, both the first quantity and the second quantity are less than a total quantity of harmonic components in the first current, a frequency of one first compensation harmonic component in the first quantity of first compensation harmonic components is the same as a frequency of one harmonic component in the first current, a frequency of one second compensation harmonic component in the second quantity of second compensation harmonic components is the same as a frequency of one harmonic component in the first current, and a spectrum of the first quantity of first compensation harmonic components and a spectrum of the second quantity of second compensation harmonic components are completely different or not completely the same. In addition, an amplitude of a compensation harmonic component needs to have an opposite sign to an amplitude of a harmonic component with a same frequency as the compensation harmonic component, to cancel out or weaken the harmonic component.

In the power supply method, different power conversion modules are used to compensate for harmonic currents of different orders, to reduce a computing power requirement for a single power conversion module, reduce system costs, and achieve effect of compensating for harmonic currents of a large quantity of orders, so as to reduce harmonic pollution of the power grid by the uninterruptible power system.

During actual application, in addition to the harmonic current, a fundamental reactive current can be generated in an operation process of the load. Therefore, a fundamental reactive current component may be further detected in the first current.

In some embodiments, the first compensation current may further include a compensation fundamental reactive current component, and/or the second compensation current may further include a compensation fundamental reactive current component, and a frequency of the compensation fundamental reactive current component is the same as a frequency of a fundamental reactive current component in the first current. In addition, an amplitude of a compensation fundamental reactive current component needs to have an opposite sign to an amplitude of a fundamental reactive current component with a same frequency as the compensation fundamental reactive current component, to cancel out or weaken the fundamental reactive current component in the power grid after the compensation fundamental reactive current component is output, and improve a situation of the fundamental reactive current in the power grid.

In some other embodiments, if a current effective value of a fundamental reactive current component in the first current is large, a third power conversion module may be further disposed separately in a plurality of power conversion modules, to separately compensate for the fundamental reactive current component. For example, the third power conversion module may be controlled to output a third compensation current, where the third compensation current includes a compensation fundamental reactive current component, and a frequency of the compensation fundamental reactive current component is the same as a frequency of the fundamental reactive current component in the first current. In addition, an amplitude of a compensation fundamental reactive current component needs to have an opposite sign to an amplitude of a fundamental reactive current component with a same frequency as the compensation fundamental reactive current component, to cancel out or weaken the fundamental reactive current component in the power grid after the compensation fundamental reactive current component is output, and improve a situation of the fundamental reactive current in the power grid.

In this embodiment, a quantity of first power conversion modules, a quantity of second power conversion modules, and a quantity of third power conversion modules may be determined based on current effective values of harmonic components that need to be compensated for in the first current and an optimal efficiency current value of a single power conversion module. Therefore, the quantity of first power conversion modules may be further controlled to be positively correlated with a current effective value of the first compensation harmonic component, and the quantity of second power conversion modules may be further controlled to be positively correlated with a current effective value of the second compensation harmonic component. For example, the quantity of first power conversion modules may be obtained by rounding up (the current effective value of the harmonic component that needs to be compensated for/the optimal efficiency current value of the single power conversion module), the quantity of second power conversion modules may be obtained by rounding up (the current effective value of the harmonic component that needs to be compensated for/the optimal efficiency current value of the single power conversion module), and the quantity of third power conversion modules may be obtained by rounding up (the current effective value of the fundamental reactive current component that needs to be compensated for/the optimal efficiency current value of the single power conversion module). The rest may be deduced by analogy.

In some embodiments, after the quantity of first power conversion modules, the quantity of second power conversion modules, and the quantity of third power conversion modules separately meet the foregoing requirements, there may also be one or more fourth power conversion modules in the plurality of power conversion modules. The fourth power conversion module may be controlled to be in a sleep state, and does not compensate for any fundamental reactive current or harmonic current.

In some other embodiments, after the quantity of first power conversion modules, the quantity of second power conversion modules, and the quantity of third power conversion modules separately meet the foregoing requirements, a total quantity of the plurality of power conversion modules may alternatively be less than a sum of the quantity of first power conversion modules, the quantity of second power conversion modules, and the quantity of third power conversion modules. In this case, the quantity of first power conversion modules, the quantity of second power conversion modules, and the quantity of third power conversion modules need to be corrected, to ensure that the sum of the quantity of first power conversion modules, the quantity of second power conversion modules, and the quantity of third power conversion modules is less than or equal to the total quantity of the plurality of power conversion modules.

An embodiment further provides a power supply system. The system includes the uninterruptible power system provided in embodiments and a battery group connected to the uninterruptible power system. Because the battery group may undergo frequent charging and discharging processes, a battery type suitable for frequent charging and discharging may be selected. For example, a battery group including lithium batteries may be selected. When the battery group is used in a small power supply system, the battery group may be disposed inside or outside the UPS. When the battery group is used in a medium or large power supply system, the battery group is large in size and can be disposed outside the UPS.

A person skilled in the art can make various modifications and variations to the embodiments without departing from their spirit and scope. The embodiments are intended to cover these modifications and variations, as well as their equivalent technologies.

The invention claimed is:

1. An uninterruptible power system, comprising:

an input end configured to connect to a power grid;

an output end configured to connect to a load;

a bypass switch module, one end of the bypass switch module is connected to the input end, the other end of the bypass switch module is connected to the output end, the bypass switch module is configured to connect the power grid to the load, and when the bypass switch module connects the power grid to the load, a first current is present between the input end and the output end;

and a plurality of power conversion modules, one end of each of the plurality of power conversion modules is connected to the input end, another end of each of the plurality of power conversion modules is connected to the output end, and the plurality of power conversion modules comprise a first power conversion module and a second power conversion module; wherein when the bypass switch module connects the power grid to the load, the first power conversion module is configured to output a first compensation current, and the second power conversion module is configured to output a second compensation current, wherein the first compensation current comprises a first quantity of first compensation harmonic components, the second compensation current comprises a second quantity of second compensation harmonic components, both the first quantity and the second quantity are less than a total quantity of harmonic components in the first current, a frequency of one first compensation harmonic component in the first quantity of first compensation harmonic components is the same as a frequency of one harmonic component in the first current, a frequency of one second compensation harmonic component in the second quantity of second compensation harmonic components is the same as a frequency of one harmonic component in the first current, and a spectrum of the first quantity of first compensation harmonic components and a spectrum of the second quantity of second compensation harmonic components are completely different or not completely the same.

2. The uninterruptible power system according to claim 1, wherein the first compensation current further comprises a compensation fundamental reactive current component, or the second compensation current further comprises a compensation fundamental reactive current component, and a frequency of the compensation fundamental reactive current component is the same as a frequency of a fundamental reactive current component in the first current.

3. The uninterruptible power system according to claim 1, wherein the plurality of power conversion modules further comprise a third power conversion module; and when the bypass switch module connects the power grid to the load, the third power conversion module is configured to output a third compensation current, the third compensation current comprises a compensation fundamental reactive current component, and a frequency of the compensation fundamental reactive current component is the same as a frequency of a fundamental reactive current component in the first current.

4. The uninterruptible power system according to claim 2, wherein the plurality of power conversion modules further comprise a third power conversion module; and when the bypass switch module connects the power grid to the load, the third power conversion module is configured to output a third compensation current, the third compensation current comprises a compensation fundamental reactive current component, and a frequency of the compensation fundamental reactive current component is the same as a frequency of a fundamental reactive current component in the first current.

5. The uninterruptible power system according to claim 1, wherein a quantity of first power conversion modules is positively correlated with a current effective value of the first compensation harmonic component, and a quantity of second power conversion modules is positively correlated with a current effective value of the second compensation harmonic component.

6. The uninterruptible power system according to claim 1, wherein the plurality of power conversion modules further comprise a fourth power conversion module.

7. The uninterruptible power system according to claim 2, wherein a quantity of first power conversion modules is positively correlated with a current effective value of the first compensation harmonic component, and a quantity of second power conversion modules is positively correlated with a current effective value of the second compensation harmonic component.

8. The uninterruptible power system according to claim 2, wherein the plurality of power conversion modules further comprise a fourth power conversion module.

9. A method for an uninterruptible power system, comprising:

controlling a bypass switch module to connect a power grid connected to an input end of the uninterruptible power system to a load connected to an output end, detecting a first current between the input end and the output end; and controlling a first power conversion module to output a first compensation current, and controlling a second power conversion module to output a second compensation current, wherein the first compensation current comprises a first quantity of first compensation harmonic components, the second compensation current comprises a second quantity of second compensation harmonic components, both the first quantity and the second quantity are less than a total quantity of harmonic components in the first current, a frequency of one first compensation harmonic component in the first quantity of first compensation harmonic components is the same as a frequency of one harmonic component in the first current, a frequency of one second compensation harmonic component in the second quantity of second compensation harmonic components is the same as a frequency of one harmonic component in the first current, and a spectrum of the first quantity of first compensation harmonic components and a spectrum of the second quantity of second compensation harmonic components are different.

10. The method according to claim 9, wherein the first compensation current further comprises a compensation fundamental reactive current component, and/or the second compensation current further comprises a compensation fundamental reactive current component, and a frequency of the compensation fundamental reactive current component is the same as a frequency of a fundamental reactive current component in the first current.

11. The method according to claim 9, further comprising:

controlling a third power conversion module to output a third compensation current, wherein the third compensation current comprises a compensation fundamental reactive current component, and a frequency of the compensation fundamental reactive current component is the same as a frequency of a fundamental reactive current component in the first current.

12. The method according to claim 10, further comprising:

controlling a third power conversion module to output a third compensation current, wherein the third compensation current comprises a compensation fundamental reactive current component, and a frequency of the compensation fundamental reactive current component is the same as a frequency of a fundamental reactive current component in the first current.

13. The method according to claim 9, further comprising:

controlling a quantity of first power conversion modules to be positively correlated with a current effective value of the first compensation harmonic component.

14. The method according to claim 9, further comprising:

controlling a fourth power conversion module to be in a sleep state.

15. The method according to claim 10, further comprising:

controlling a quantity of first power conversion modules to be positively correlated with a current effective value of the first compensation harmonic component, and a quantity of second power conversion modules to be positively correlated with a current effective value of the second compensation harmonic component.

16. The method according to claim 10, further comprising:

controlling a fourth power conversion module to be in a sleep state.

17. The uninterruptible power system according to claim 1, wherein the first compensation current further comprises a compensation fundamental reactive current component, and the second compensation current further comprises a compensation fundamental reactive current component, and a frequency of the compensation fundamental reactive current component is the same as a frequency of a fundamental reactive current component in the first current.

18. The uninterruptible power system according to claim 6, wherein, when the bypass switch module connects the power grid to the load, the fourth power conversion module is in a sleep state.

19. The uninterruptible power system according to claim 2, when the bypass switch module connects the power grid to the load, the fourth power conversion module is in a sleep state.

20. The method according to claim 13, further wherein a quantity of second power conversion modules to be positively correlated with a current effective value of the second compensation harmonic component.

* * * * *